United States Patent [19]
Turiot et al.

[11] 4,402,477
[45] Sep. 6, 1983

[54] TANDEM TYPE LANDING GEAR

[75] Inventors: Andre Turiot, Morsand S/Orge; Michel Derrien, Versailles, both of France

[73] Assignee: Messier-Hispano-Bugatti (SA), Montrouge, France

[21] Appl. No.: 364,699

[22] Filed: Apr. 2, 1982

[30] Foreign Application Priority Data

Apr. 8, 1981 [FR] France ................. 81 07025

[51] Int. Cl.³ .............................................. B64C 25/26
[52] U.S. Cl. ......................... 214/102 R; 244/102 SL
[58] Field of Search ......... 244/100 R, 102 R, 102 SS, 244/102 SL, 104 R, 50; 74/520, 469

[56] References Cited

U.S. PATENT DOCUMENTS 2,475,723 7/1949 Sanford ................. 244/102 SL
4,355,773 10/1982 Masclef et al. ................. 244/102 R

FOREIGN PATENT DOCUMENTS 1465428 9/1961 France .
1404499 5/1965 France .
877505 9/1961 United Kingdom .
878385 9/1961 United Kingdom .
1042190 9/1966 United Kingdom .

Primary Examiner—Galen L. Barefoot
Attorney, Agent, or Firm—Sughrue, Mion, Zinn, Macpeak & Seas

[57] ABSTRACT

The present invention relates to landing gears. The landing gear includes essentially two legs (1, 2) comprising respecitvely two arms (10, 28) and two rocker beams (3, 24), a bar (21) forming with the two arms (10, 28) a deformable parallelogram, a strut (37) consisting of two levers (23, 38) placed on a diagonal of the parallelogram, two locking links (50, 51) cooperating with the strut (37), these two rotatably mounted links being rotated by an actuator (70) and a spring (60). The landing gear finds its application in commuter aircraft fitted with tandem type landing gears.

10 Claims, 2 Drawing Figures

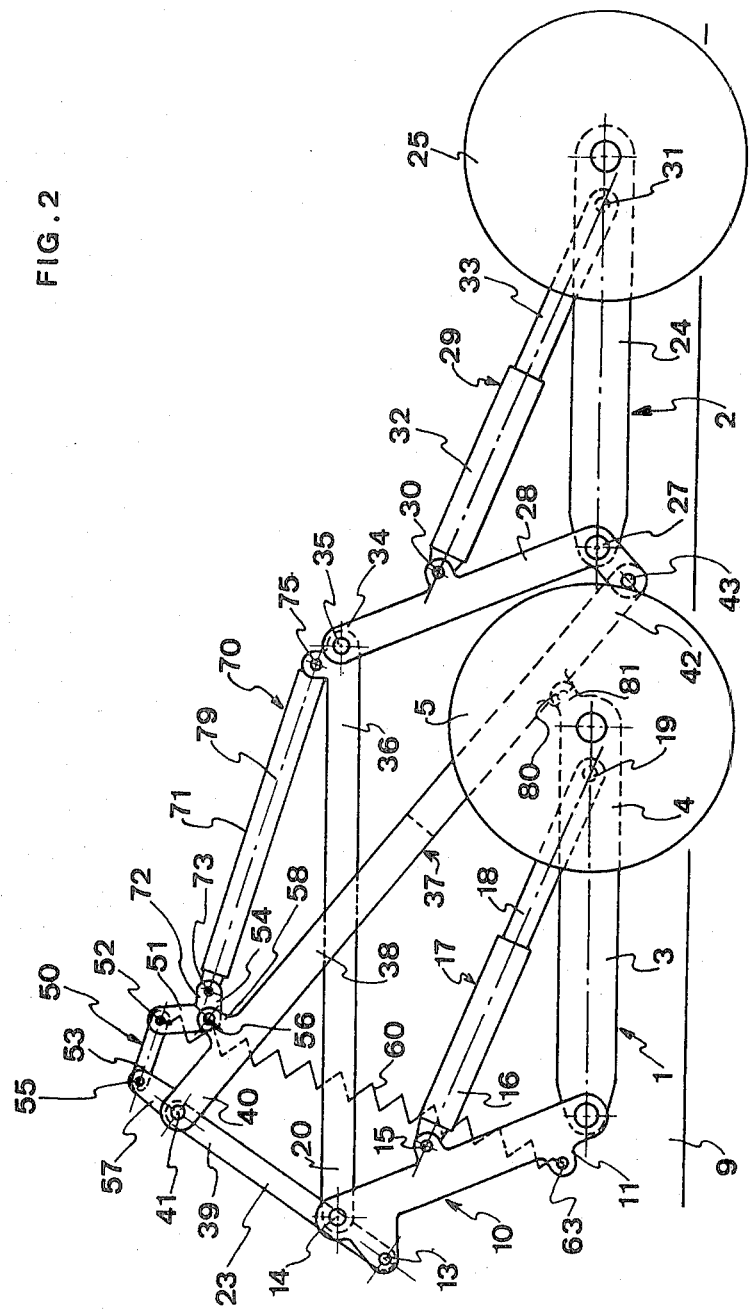

TANDEM TYPE LANDING GEAR

FIELD OF THE INVENTION

This invention relates to retractable landing gears and more particularly to those of the so-called fuselage type with a set of wheels mounted in tandem.

BACKGROUND OF THE INVENTION

Embodiments of such landing gears are already known to the prior art. These landing gears are generally installed on aircraft designed for very short trips and commonly referred to as commuters.

They all yield good results but none meets all the criteria relative to solidity, reliability, minimum dimensions and design simplicity while ensuring the movement of the landing gear from the retracted position to the extended position without great difficulty.

It is a basic object of the invention to overcome these drawbacks and to provide a main landing gear of the tandem fuselage type which has a simple design but nevertheless provides good reliability and good solidity while maintaining full safety, notably when moving the landing gear from the retracted to the extended position.

More precisely, the present invention provides a retractable landing gear assuming two positions, retracted and extended, of the fuselage type with wheels mounted in tandem for an aircraft having a rigid structure, comprising two substantially identical legs each having a rocker beam and an arm linked by a shock absorber, each rocker beam and arm being capable of rotating respectively around two pins integral with said rigid structure, a rod connecting said two arms around two rotation pins to form between this rod, the two arms, the two pins integral with the rigid structure and the two rotation pins a deformable parallelogram, a strut "breaking" into at least two levers mounted rotatably around the same first pin, the ends not connected to the first pin being mounted rotatably respectively around a second pin integral with a first arm substantially near the pin integral with said rigid structure around which is rotatably mounted and a third pin integral with the other second leg on said second arm such that the portion of the line passing substantially through said third pin and the second pin forms a diagonal of said parallelogram, the difference in the length of the two levers being substantially greater than the value of this diagonal when said landing gear is in the extended position so that the two levers are slightly disaligned.

According to another feature of the present invention, means are provided for blocking said strut when the two said levers are slightly disaligned.

According to a further characteristic of the present invention, the blocking means include links mounted on one of their ends rotatably around a fourth rotation pin, their other ends being mounted rotatably respectively around the fifth and sixth rotation pins respectively integral with two stems respectively integral with the two levers.

According to another characteristic of the invention, the total length of the two links is slightly greater than the distance between the fifth and sixth pins when the two levers are slightly disaligned.

According to yet another characteristic of the invention, the landing gear comprises means for exerting an elastic force on said two links.

According to another characteristic of the present invention, one of the said two stems is located near said first pin.

Other characteristics and advantages of the present invention will appear from the following description in connection with the appended drawings.

BRIEF DESCRIPTION OF THE DRAWINGS

FIGS. 1 and 2 represent a side view of an embodiment of a retractable landing gear respectively in the extended position and the retracted position.

DESCRIPTION OF THE PREFERRED EMBODIMENT

Figure 1:
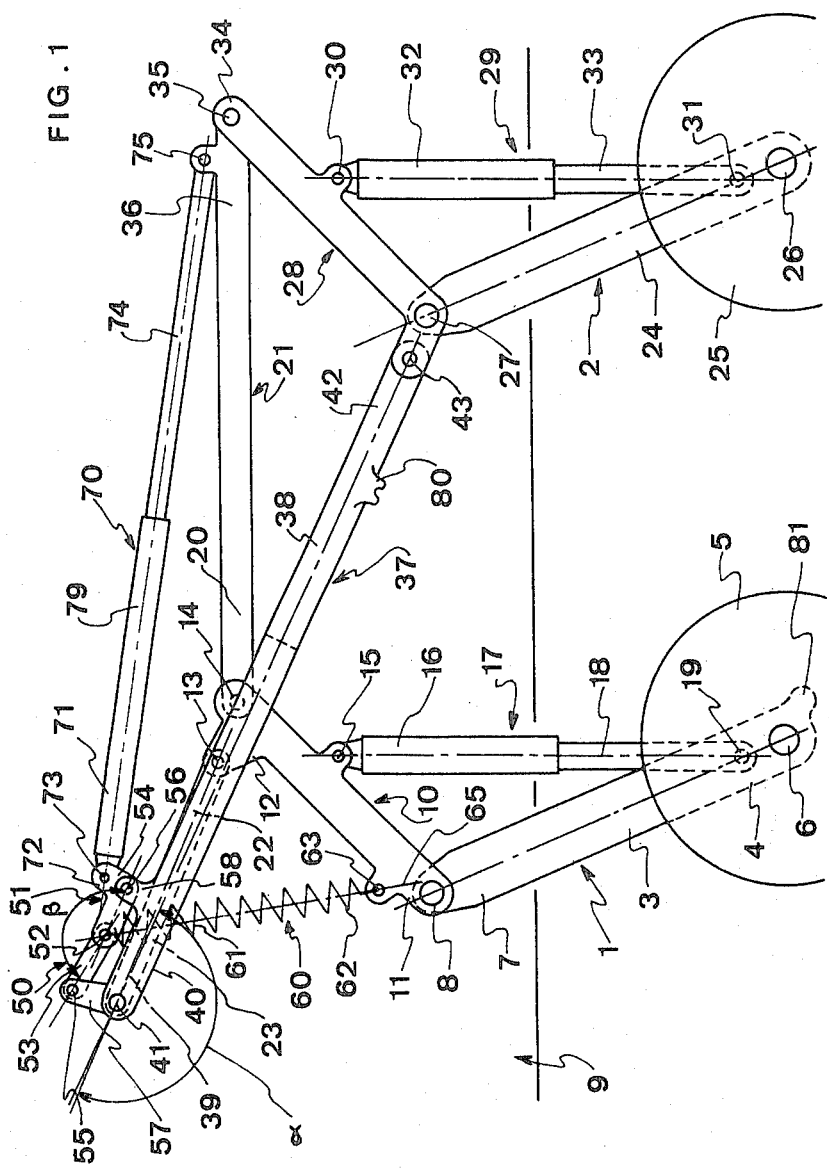

Referring to either of the figures, in which the same reference numbers represent the same components, the landing gear comprises essentially two legs 1 and 2.

The leg 1 includes a rocker beam 3 of which one end 4 supports rolling means such as a wheel 5 mounted on an axle.

The other end 7 of the rocker beam 3 is mounted rotatably on a pin 8 integral with the rigid frame of an aircraft 9. The leg 1 also includes an arm 10 of which one end 11 is also mounted rotatably on the pin 8. The other end 12 includes a certain number of pins 13, 14, 15 around which are articulated different components. Around the pin 15 is attached the end 16, notably the cylinder of a shock absorber 17 whose rod 18 is mounted rotatably on a pin 19 of the end 4 of the rocker beam 3. The pin 14 supports the end 20 of a bar 21 whereas the pin 13 supports the end 22 of a lever 23.

The leg 2 is made up substantially like the leg 1 and includes a rocker beam 24 supporting a wheel 25 mounted on its axle 26. The rocker beam 24 is mounted rotatably on a pin 27 integral with the frame 9. This pin 27 supports a second arm 28. This arm 28 is connected to the rocker beam 24 by a shock absorber 29 between the two pins 30 and 31 supporting respectively the cylinder 32 and the rod 33 of the shock absorber 29. The end 34 of the arm 28 includes a pin 35 around which is mounted rotatably the end 36 of the bar 21 previously mentioned. The distances between the pins 8 and 14, on the one hand, and the pins 27 and 35, on the other hand, are equal. Furthermore, the length of the bar 21 taken between the pins 14 and 35 is equal to the distance between the pins 8 and 27. These conditions are such that the two arms 10 and 28 form, with the bar 21, a deformable parallelogram when the two arms swivel respectively around the pins 8 and 27.

The landing gear also includes a strut 37 made up of a first lever 38 and of a second lever 23 previously mentioned. These two levers are mounted on one of their ends 39 and 40 rotatably around the same first pin 41, while the other end 42 of the lever 38 is mounted rotatably around a pin 43 located on the arm 28 substantially near the pin 27. As previously mentioned, the end 22 of the lever 23 is mounted rotatably around the pin 13 which is advantageously located near the pin 14 supporting the bar 21.

The pins 13 and 43 are located substantially near the pins 14 and 27 respectively so that the line passing through these two pins 13 and 43 constitutes a diagonal of the parallelogram. Further, the length of the two levers 38 and 23 is determined so that when the landing gear is in the extended position as shown in FIG. 1 these two levers are substantially aligned and can even form a slight angle.

In this case, the difference in the lengths of the two levers is substantially equal to the length of the diagonal of the deformable parallelogram when the landing gear is in the extended position as shown in FIG. 1. Advantageously, the landing gear includes locking means for the two levers 38 and 23 when they are in the substantially aligned position (FIG. 1). These means are made up essentially of two links 50 and 51 mounted rotatably in relation to each other at one of their ends around a pin 52. The other ends 53 and 54 are mounted rotatably respectively around two pins 55 and 56 respectively of two stems 57 and 58, the stem 57 being linked with the end 40 of the lever 38 at a certain predetermined distance from the pin 41. This distance, and more particularly the length of the two links 50 and 51, is determined so that the two links form a certain angle when the two levers 23 and 38 are "aligned" (FIG. 1) very close to a flat angle.

More precisely, as already mentioned above, the two levers 23 and 38 form a certain angle close to a flat angle when the landing gear is in the extended position (FIG. 1) as do the two links 50 and 51, these two angles being substantially in opposition so that their concavities are in opposite directions as represented respectively at $\alpha$ and $\beta$ in FIG. 1.

Advantageously, the landing gear includes means for exerting a return force on the two links so as to keep them in the position defining the angle $\beta$. These means consist advantageously of a tension spring 60 of which one end 61 is attached on the pin 52, or near it, and the other end 62 is attached on the arm 10 at a point 63 advantageously the farthest from the pin 27, i.e. near the pin 8.

Finally, the landing gear includes means for moving it from the extended position according to FIG. 1 to the retracted position according to FIG. 2.

Advantageously, these means consist of an actuator 70 of which one end 71, notably the cylinder 71, is fixed rotatably on a pin 73 located on a projecting part 72 of the end 54 of the link 51; the other end of the actuator 70, notably the rod 74, is fixed near the pin 35 or more precisely the end 34 of the arm 28, for example, on a rotation pin 75 integral with the end 36 of the bar 21.

The operation of the landing gear when it is in the extended position and the aircraft has landed and is taxiing is the following:

In this position, the landing gear is as illustrated in FIG. 1. The strut 37 and the blocking means are in a position which prevent any deformation of the parallelogram. In fact, the two angles $\alpha$ and $\beta$ in opposition prevent any "breaking" of the strut and of the locking means to which is added the action of the extended actuator 70 and that of the tension spring 60 which favors the maintenance of the angle $\beta$. Consequently, the parallelogram being nondeformable, the two arms 10 and 28 are fixed in relation to the frame 9 of the aircraft and cannot undergo any rotation around the pins 8 and 27. When the wheels 5 and 25 encounter obstacles, hollows as well as bumps, the two rocker beams 3 and 24 undergo clockwise and counterclockwise rotations respectively around the pins 8 and 27, these rotations being dampened respectively by the shock absorbers 17 and 29 in a well-known manner.

The operation of the landing gear when it moves from the extended position (FIG. 1) to the retracted position (FIG. 2) and vice versa is the following:

To move the landing gear from the extended position to retracted position, the actuator 70 is operated in order to shorten it. This creates two opposing forces; one on the end 74 rotates the arm 28 counterclockwise, and the end 71 rotates the link 51 clockwise against the action of the tension spring 60. The latter rotation breaks the quasi-alignment of the two links 50, 51 and causes the counterclockwise swiveling of the link 50. The rotations of the two links 50 and 51 contribute to moving the two pins 55 and 56 closer together, leading to a clockwise rotation of the lever 23 by its stem 57. As the pin 41 is raised, the rotation of the lever 23, favored by the deformation of the parallelogram and more particularly by the force exerted on the pin 75 by the actuator 70, is such that the two arms 10 and 28 both swivel counterclockwise and produce the same rotation of the two rocker beams 3 and 24 which are connected to the two arms respectively by the two shock absorbers 17 and 29 which are extended, within a certain limit.

The landing gear is completely raised when the actuator has moved through its entire stroke which is of course predetermined to obtain correct retraction.

The lowering of the landing gear, i.e. its movement from the retracted position to the extended position, takes place by operating the actuator 70 so that it elongates. In this way, the links, levers, arms and rocker beams undergo rotations in the direction opposite that described above until all the components of the landing gear assume their position as shown in FIG. 1.

The landing gear described above has all the safety features required and in particular those which prevent it from retracting when it is in the extended position owing to a slight disalignment in opposition respectively of the levers 23, 38 and of the links 50, 51. Advantageously, to prevent the landing gear from lowering inadvertently when it is in the retracted position, it includes an uplock box 80, shown schematically, integral with the lever 38 and capable of cooperating with a hook 81 integral with the end 4 of the rocker beam 3. This uplock box 80 can be controlled automatically and/or manually.

The structure of the landing gear described above, in addition to the advantages already mentioned, offers that of being able to move from the retracted position to the extended position even when, for example, the hydraulic fluid generator is defective and cannot operate the actuator 70.

In fact, the landing gear can move from the retracted position (FIG. 2) to the extended position (FIG. 1) by itself. to accomplish this, one need only operate manually the uplock box so as to free the hook 81 under the effect of the weight of the rocker beams and wheels essentially, the two arms 10 and 28 swiveling simultaneously thanks to the deformable parallelogram and are able to assume their final positions, as can the levers 23, 38 and the links 50, 51 aided in this regard by the action of the spring 60 which makes it possible to obtain, for the levers and links, their respective angular positions $\alpha$ and $\beta$.

In fact, it is noted that the moment exerted by the spring with respect to the pin 27 is very large owing to its lever arm defined by the distance from the pin 27 to the axis 65 of the spring. This moment is much greater than the greatest resistant moment which is the one of the actuator 70 because its lever arm is small since it is determined by the distance from the pin 27 to the axis 79 of the actuator 70.

Furthermore, to avoid any ambiguity in the understanding of the figures, it is pointed out that, from a structural viewpoint, the planes of the two rocker beams 3 and 24 form a certain angle with those of the arms 10 and 28 and that in fact the representation of these rocker beams is only their projection onto an imaginery plane defined by the plane of the arms. This makes it possible for the wheel 5, when it is raised, to move in front of the lever 38 without hindrance. Similarly, the lever 38 is made up of a U-shaped component whose hollow contains the lever 23 and the end 12 of the arm 10. This hollow also allows the passage of the bar 21 when the landing gear is raised.

What is claimed is:

1. Retractable landing gear for assuming "retracted" and "extended" positions, and being of the fuselage type with wheels mounted in tandem for an aircraft having a rigid structure, said landing gear comprising two substantially identical legs each having a rocker beam and an arm linked by a shock absorber, each rocker beam and arm being rotatably mounted, respectively, around two pins integral with said rigid structure, a bar connecting said two arms around two rotation pins to form a deformable parallelogram between said bar, the two arms and the two pins being integral with the rigid structure, a "breaking" strut comprising at least two levers mounted rotatably around the same first pin, the ends not connected to the first pin being mounted rotatably respectively around a second pin integral with a first arm substantially near the pin integral with said rigid structure around which it is rotatably mounted and a third pin integral with the other second leg on said arm such that the portion of the line passing substantially through said third pin and the second pin forms a diagonal of said parallelogram, and the difference in the lengths of the two levers being substantially greater than the value of said diagonal when said landing gear is in the extended position so that the two levers are slightly disaligned.

2. The landing gear of claim 1 further comprising means for blocking said strut in its slightly disaligned position.

3. The landing gear of claim 2 wherein said blocking means include links mounted on one of their ends rotatably around a fourth rotation pin, their other ends being mounted rotatably respectively around fifth and sixth rotation pins respectively integral with two stems respectively integral with the two levers.

4. The landing gear of claim 3 wherein the total added length of the two links is slightly greater than the distance between the fifth and sixth pins when the two levers are slightly disaligned in the extended position of the landing gear.

5. The landing gear of claim 4 further comprising means for exerting an elastic force on said two links.

6. The landing gear of claim 5, wherein one lever is shorter than the other, said force exerting means consist of a tension spring of which one end is connected to at least one of said two links between said fifth and sixth pins, and the other end is connected to the arm on which is fixed the shortest of the two levers, near the rotation pin integral with the rigid structure of the aircraft.

7. The landing gear of claim 3 or claim 6 wherein one of said two stems is located near said first pin.

8. The landing gear of claim 1, further comprising controllable means for exerting two rotation forces respectively on at least one of the two links and on one of said two arms.

9. The landing gear of claim 8 wherein said controllable means include an actuator having one end mounted rotatably on a projecting part integral with a link and the other end linked with the arm farthest from said link, this link being chosen to obtain a given rotation.

10. The landing gear of claim 6, further comprising an uplock box integral with the longest of the two levers and a hook integral with one of the two rocker beams and engagable with said uplock box.

* * * * *